(12) United States Patent
Weir et al.

(10) Patent No.: US 9,422,459 B2
(45) Date of Patent: Aug. 23, 2016

(54) COATINGS FOR PROTECTION AGAINST CORROSION IN ADHESIVELY BONDED STEEL JOINTS

(75) Inventors: John Douglas Weir, Huntington, NY (US); John Abraham Crawford, Miller Place, NY (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 621 days.

(21) Appl. No.: 13/191,600

(22) Filed: Jul. 27, 2011

(65) Prior Publication Data

US 2013/0029173 A1     Jan. 31, 2013

(51) Int. Cl.
| | | |
|---|---|---|
| *B21D 39/00* | (2006.01) | |
| *C09J 5/02* | (2006.01) | |
| *F16B 11/00* | (2006.01) | |
| *F16B 1/00* | (2006.01) | |

(52) U.S. Cl.
CPC .............. *C09J 5/02* (2013.01); *C09J 2400/163* (2013.01); *C09J 2400/166* (2013.01); *F16B 11/006* (2013.01); *F16B 2001/0064* (2013.01); *Y10T 428/12535* (2015.01); *Y10T 428/12972* (2015.01); *Y10T 428/249923* (2015.04); *Y10T 428/31678* (2015.04)

(58) Field of Classification Search
None
See application file for complete search history.

(56) References Cited

U.S. PATENT DOCUMENTS

| | | | | |
|---|---|---|---|---|
| 2,908,966 | A * | 10/1959 | Wagner | .......................... 428/656 |
| 3,692,341 | A * | 9/1972 | Brown et al. | .............. 403/408.1 |
| 3,893,903 | A * | 7/1975 | Lindholm | ................ 204/196.17 |
| 4,180,442 | A | 12/1979 | Byrd | |
| 4,287,034 | A | 9/1981 | Pieslak et al. | |
| 4,728,544 | A * | 3/1988 | Asoshina et al. | .......... 427/407.3 |
| 4,751,113 | A * | 6/1988 | Riccio | ....................... C23C 4/02 |
| | | | | 427/405 |
| 4,772,344 | A * | 9/1988 | Andoe | ............................ 156/64 |
| 4,855,001 | A * | 8/1989 | Damico et al. | ............. 156/307.3 |
| 5,670,261 | A | 9/1997 | Kameya et al. | |
| 5,862,975 | A | 1/1999 | Childress | |
| 5,879,810 | A * | 3/1999 | Ellwood et al. | ............... 428/416 |
| 6,050,208 | A * | 4/2000 | Kennedy | .................... 114/74 A |
| 6,051,327 | A | 4/2000 | Serafin et al. | |
| 6,235,409 | B1 | 5/2001 | Serafin et al. | |
| 6,428,858 | B1 * | 8/2002 | Bolton et al. | ................. 427/449 |
| 6,613,452 | B2 | 9/2003 | Weir | |

(Continued)

FOREIGN PATENT DOCUMENTS

| | | | |
|---|---|---|---|
| CN | 101342634 | * | 8/2005 |
| JP | S55116774 A | | 9/1980 |

(Continued)

OTHER PUBLICATIONS

Brockmann, W., et al., "Adhesive Bonding as a Joining Technique," Adhesive Bonding: Materials, Applications and Technology, ISBN: 978-3-527-31898-8, 2009.

(Continued)

*Primary Examiner* — Daniel J Schleis
(74) *Attorney, Agent, or Firm* — Robert P. Lenart, Esq.; Pietragallo Gordon Alfano Bosick & Raspanti, LLP

(57) ABSTRACT

An apparatus includes a first steel component having a first surface, a second steel component having a second surface, a corrosion resistant coating on at least one of the first and second surfaces, and an adhesive bonding the first and second components together. The corrosion resistant coating can be electrically conductive.

20 Claims, 2 Drawing Sheets

(56) References Cited

U.S. PATENT DOCUMENTS

| | | | |
|---|---|---|---|
| 6,749,254 | B1 | 6/2004 | Kleven et al. |
| 7,574,835 | B2 | 8/2009 | Bohlmann |
| 2008/0251201 | A1* | 10/2008 | Sikkel et al. ............ 156/330 |
| 2009/0252986 | A1* | 10/2009 | Owen et al. ............ 428/623 |

FOREIGN PATENT DOCUMENTS

| | | | |
|---|---|---|---|
| RU | 2063469 | C1 | 7/1996 |
| WO | WO9105085 | * | 4/1991 |
| WO | WO2011083321 | * | 7/2011 |

OTHER PUBLICATIONS

Courtney, P., "Joining Metal with Adhesives—Assembly Tech Cell," Advantages, applications, and precautions, 3 pp., Jan. 9, 2007.

Bordes, M., et al., "Prediction of Long Term Strength of Adhesively bonded Steel/Epoxy Joints in Sea Water," International Journal of Adhesion and Adhesives, vol. 29, Issue 6, pp. 595-608, Sep. 2009.

Weir, John D., et al., "Rapid Infrared Imaging of Corrosion and Structural Defects Under Organic Coatings," Technology Review Journal, pp. 45-62, Spring/Summer 2008.

Department of Defense, United States of America; MIL-STD-889B (Jul. 7, 1976), Superseding MIL-STD-889A (Sep. 25, 1969), Military Standard Dissimilar Metals, 26 pp.

Sulzer Metco, "Termal Spray Materials Guide," 176 pp., Feb. 2006.

Sulzer Metco, "Braze Materials Guide," 24 pp., Nov. 2010.

Wall Colmonoy Corporation, "Nicrobraz Technical Data Sheet, Brazing Filler Metal Selector Chart," Products and Services for High-Temperature Brazing, No. 2.1.1 Rev. U., 4 pp., 2005.

International Marine, "Intergard 264 Epoxy," Ref. 271, 4 pp., Jul. 7, 2009.

Henkel Corporation Aerospace Group, "Hysol EA 9396, Epoxy Paste Adhesive," 4 pp., Jun. 2002.

BLP Mobile Paints, "Epoxy/Polyamide Green Primer, MIL-P-24441/1B, F150, Type I, (40-CM-1)," Product Data, Epoxy / Polyamide, 2 pp., Jul. 1999.

Department of Defense, United States of America; MIL-STD-1250A (Jun. 29, 1992), Superseding MIL-STD-1250 (Mar. 31, 1967), "Military Standard Corrosion Prevention and Deterioration Control in Electronic Components and Assemblies," downloaded from http://www.everyspec.com, 47 pp.

* cited by examiner

COATINGS FOR PROTECTION AGAINST CORROSION IN ADHESIVELY BONDED STEEL JOINTS

STATEMENT OF GOVERNMENT INTEREST

This invention was conceived under NAVSEA Contract No. N00024-02-C-2302. The United States Government may have rights to this invention in accordance with the contract.

FIELD OF THE INVENTION

The present invention relates to adhesively bonded structures and more particularly to corrosion resistant adhesively bonded structures.

BACKGROUND INFORMATION

Marine corrosion on steel structures is a major problem for the Navy, as well as other commercial ships built of steel. A new technology is being proposed to adhesively bond critical fittings, steel coamings and other steel structures and composites together for marine applications. A problem with adhesive bonded steel structures is that they are susceptible to corrosion. Moisture/water can pass into the bonded joint and migrate to the steel which will corrode. Organic coatings and adhesives, although helpful with stopping moisture, are not completely effective.

It would be desirable to have adhesively bonded steel structures that are corrosion resistant.

SUMMARY OF THE INVENTION

In one aspect the present invention provides an apparatus including a first steel component having a first surface, a second steel component having a second surface, an electrically conductive, corrosion resistant coating on at least one of the first and second surfaces, and an adhesive bonding the first and second components together.

In another aspect the present invention provides an apparatus including a first steel component having a first surface, a second steel component having a second surface, a cermet coating or a ceramic coating on at least one of the first and second surfaces, and an adhesive bonding the first and second components together.

In another aspect the present invention provides an apparatus including a first steel component having a first surface, a second steel component having a second surface, a corrosion resistant coating on at least one of the first and second surfaces, a second corrosion resistant coating on the first corrosion resistant coating, and an adhesive bonding the first and second components together.

These and other aspects of the present invention will be more apparent from the following description.

DETAILED DESCRIPTION

Adhesively bonded steel structures include at least two steel components that are joined together using an adhesive, with or without an adhesive primer. Corrosion tends to work its way under adhesive primers and adhesives and hence cause adhesive failures of the structural components and assemblies at the steel bond line. If a corrosion resistant coating of metal or cermet were applied to the steel prior to adhesive bonding, the bond line would be protected from corrosion. Additionally, to allow for the electrical grounding of the structure for electromagnetic interference (EMI), electromagnetic compatibility (EMC), electromagnetic pulse (EMP) and lightening protection, it would be desirable to use an electrically conductive coating.

The adhesive can be selected from sealants or adhesives that are electrically conductive. Alternatively, or in addition, a conductive metallic gasket can be bonded into the joint. In other embodiments, depending on the conductivity required, it is possible to achieve electrical conductivity through the joint with non-conductive adhesive or sealant in the joint by applying high clamping forces which result in point metal to metal contact through the bonding adhesive or sealant. Properly positioned electrical bonding bolts or fasteners can also be used to provide the desired conductivity between the components.

In one embodiment, the invention relates to the application of a corrosion resistant electrically conductive coating applied by thermal spray technology on one or more steel components, prior to the application of an adhesive or adhesive primer. Then the coated components can be joined together using the adhesive to form an adhesively bonded joint or structure. Thermal spray technology encompasses a group of coating processes in which finely divided metallic or nonmetallic materials are deposited in a molten or semi-molten condition to form a coating. The coating material may be in the form of powder, ceramic-rod, wire, or molten materials. In various embodiments, the steel components can include AISI 4130, AISI 4140, AISI 1010, other low alloy steels, or high strength steels such as HSLA SAE grades, automotive steels, etc.

Figure 1:
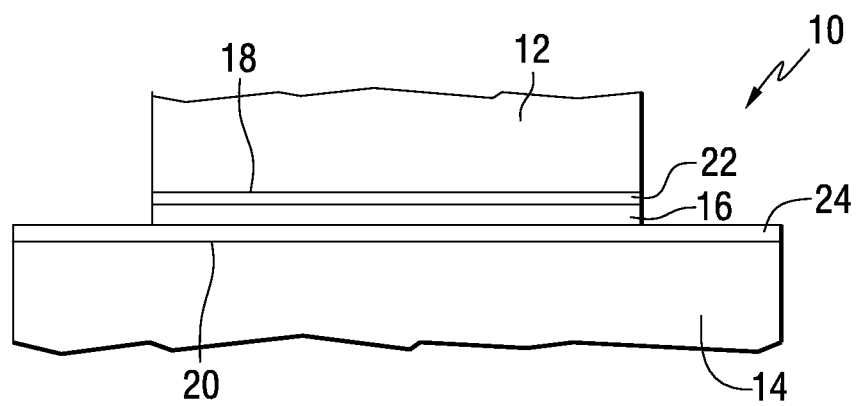
FIG. 1 is schematic representation of a portion of an adhesively bonded structure.

Referring to the drawings, FIG. 1 is schematic representation of a portion of an adhesively bonded structure 10 in accordance with an embodiment of the invention in which a first metallic component 12 is bonded to a second metallic component 14 by an adhesive material 16 positioned between a first surface 18 of the first metallic component, and a first surface 20 of the second metallic component. A first corrosion resistant conductive coating 22 is positioned on the first surface 18 of the first metallic component. A second corrosion resistant conductive coating 24 is positioned on the first surface 20 of the second metallic component. The adhesive material can be, for example, polyurethane, silicone, epoxy, acrylic, polysulfides, epoxy cured polythioether, thermoset materials, thermoplastic materials, or other materials having the desired mechanical and electrical properties. In one example, the adhesive can be Henkel Hysol® EA 9396 or similar epoxy paste adhesive with or without other coating materials that meet the requirements of Military Specification MIL-P-24441/1B. The adhesive can be used in combination with bonding primers such as BLP Mobile Paints epoxy/polyamide green primer F150 or International Paint Intergard 264 epoxy, as examples.

The corrosion resistant conductive coating can be applied by thermal spray technology on the steel, prior to the application of the adhesive. Thermal spray technology can be used to form a coating on both of the surfaces of the steel parts that are to be bonded. Examples of corrosion resistant coatings can be found in Sulzer Metco Thermal Spray Guide issued February 2006, which is hereby incorporated by reference. Coatings can be selected from the list of coatings presented in the guide that are more corrosion resistant than steel and/or more noble than steel on the galvanic series. Thermal spray coatings with the proper surface preparations can range in tensile strengths from about 200 PSI to in excess of 10,000 PSI depending on the coating application process and coating selected.

Figure 2:
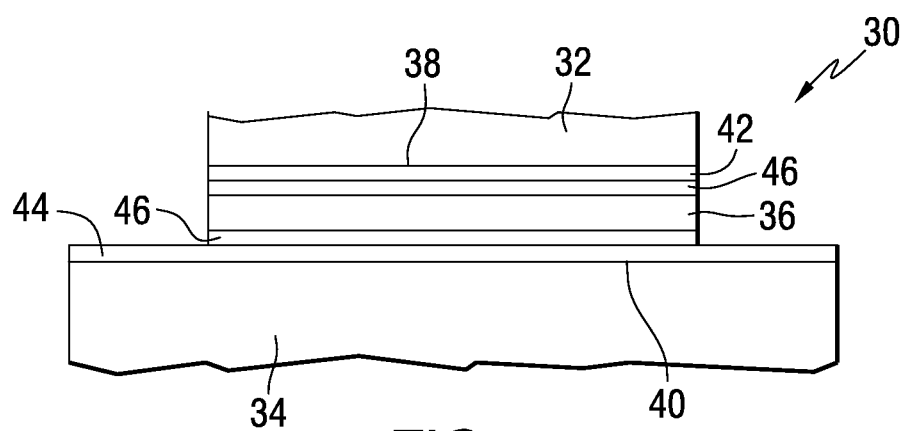
FIG. 2 is schematic representation of a portion of another adhesively bonded structure.

FIG. 2 is a schematic representation of a portion of an adhesively bonded structure 30 in accordance with another embodiment of the invention in which a first metallic component 32 is bonded to a second metallic component 34 by an adhesive material 36 positioned between a first surface 38 of the first metallic component, and a first surface 40 of the second metallic component. A first corrosion resistant electrically conductive coating 42 is positioned on the first surface 38 of the first metallic component. A second corrosion resistant electrically conductive coating 44 is positioned on the first surface 40 of the second metallic component. In this embodiment, an adhesive primer material 46 is applied to the corrosion resistant conductive coatings prior to the application of the adhesive material. This results in a layer of primer material between each of the corrosion resistant conductive coatings and the adhesive. The primer material can be, for example, epoxy or a primer material suitable or compatible with the adhesive and/or sealant system selected. Example materials that might be included in an adhesive or sealant system include 3M Product EC2216 and other epoxy Scotch-Weld™ structural type adhesives, polysulfide sealant, MIL-PRF-8802, and 3M adhesive urethane 5200. The corrosion resistant conductive coating can be applied by thermal spray technology on the steel as described above, prior to the application of the adhesive primer.

Figure 3:
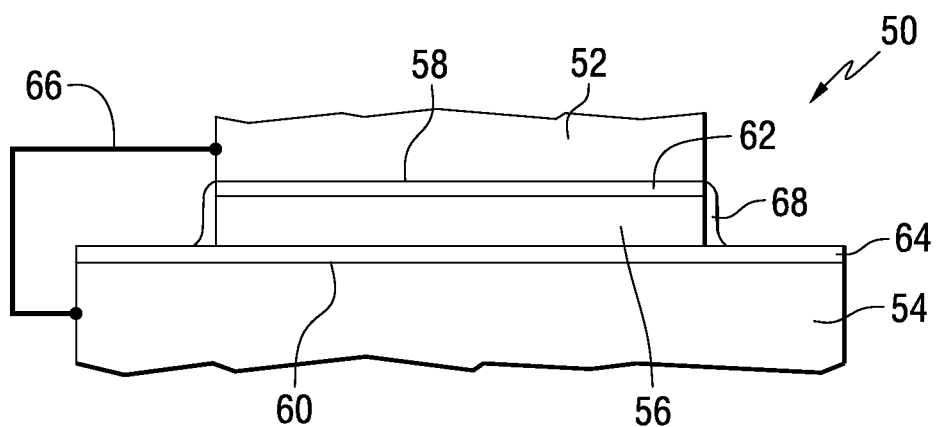
FIG. 3 is schematic representation of a portion of another adhesively bonded structure.

FIG. 3 is schematic representation of a portion of an adhesively bonded structure 50 in accordance with another embodiment of the invention in which a first metallic component 52 is bonded to a second metallic component 54 by an adhesive material 56 positioned between a first surface 58 of the first metallic component, and a first surface 60 of the second metallic component. A first corrosion resistant coating 62 is positioned on the first surface 58 of the first metallic component. A second corrosion resistant coating 64 is positioned on the first surface 60 of the second metallic component. In some embodiments, the corrosion resistant coatings can be materials that are not electrically conductive, such as cermets or ceramic materials. In this example, an electrical connection 66 is provided between the metallic components such that the structure provides the desired protection from electromagnetic interference (EMI), electromagnetic compatibility (EMC), electromagnetic pulse (EMP), and lightening protection. While the electric connection is represented schematically in FIG. 3, it will be recognized that the electrical connection can be provided by using electrical bonding bolts, fasteners or gaskets to provide the desired conductivity between the components.

The corrosion resistant coating may be sealed, if desired, with an adhesive or sealant to enhance corrosion properties. In this example, an optional sealant 68 has been applied to the edges of the adhesively bonded joint between the first and second metallic component. The sealant can be, for example, polysulfide, urethane, silicone or other suitable sealant to block moisture and water from intruding into the joint. Again, the corrosion resistant conductive coating can be applied by thermal spray technology on the steel, prior to the application of an adhesive or adhesive primer.

Figure 4:
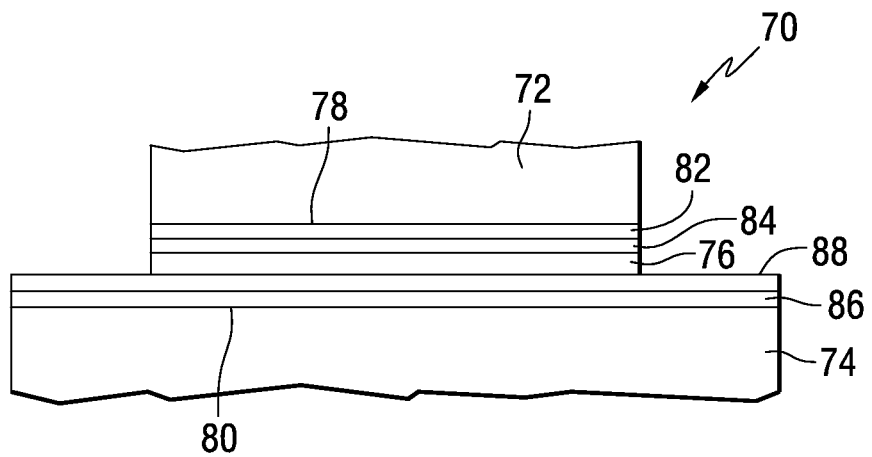
FIG. 4 is schematic representation of a portion of another adhesively bonded structure.

FIG. 4 is schematic representation of a portion of an adhesively bonded structure 70 in accordance with another embodiment of the invention in which a first metallic component 72 is bonded to a second metallic component 74 by an adhesive material 76 positioned between a first surface 78 of the first metallic component, and a first surface 80 of the second metallic component. A first corrosion resistant coating 82 is positioned on the first surface 78 of the first metallic component. A second corrosion resistant coating 84 is positioned on the corrosion resistant coating 82. A third corrosion resistant coating 86 is positioned on the first surface 80 of the second metallic component. A fourth corrosion resistant coating 88 is positioned on the corrosion resistant coating 86. In the embodiment of FIG. 4, coatings 84 and 88 can be graphite, and coatings 82 and 86 can be materials that are anodically and cathodically close to graphite in the galvanic series. Since graphite is very noble, it will corrode metals or alloys that are more anodic such as unprotected steel. In one example, titanium coated steel is preferred against graphite in an adhesively bonded joint. Other materials that can be used for the corrosion resistant coating on the steel include cobalt, nickel and titanium based alloys. One example is nickel aluminide.

In other examples, the corrosion resistant coating can include fiberglass or Kevlar coated on the steel.

In various embodiments, the corrosion resistant conductive coating can be applied by plasma spray, combustion powder spray (Thermospray®), high Velocity Oxygen-Fuel Spray (HVOF), electric arc wire spray, combustion wire spray, ChamPro® (LVPS, LPPS and VPS), a detonation gun process, and/or other similar processes or a combination of processes. Materials that can be applied using electric arc wire spray include Cu, Fe, Mb, Sn and Ti. In other embodiments, self fluxing alloys can be used. Self fluxing alloys can be applied by spraying and then fused with a torch. The preferred application technique and coating material is selected by considering the cost of the technique and coating, desired coating mechanical tensile or shear requirements, and the electrical conductivity of the alloy, ceramic or cermet.

Other processes can also be used to form the corrosion resistant coating, either independently or in conjunction with the thermal spray technology processes. Such other processes may include a brazing process, a flame spray or thermal spray process for the application of brazing alloys, brazing and/or explosive cladding. Such processes can modify the steel surface for bonding and/or provide a conductive coating that is corrosion resistant.

The corrosion resistant coating protects the steel from corrosion in a region adjacent to the bond line between the steel and the adhesive primer or adhesive. The coatings can be manufactured utilizing materials described in the Sulzer-Metco Thermal Spray Materials Guide issued February 2006 or similar materials.

The corrosion resistant coating material should be galvanically close to steel as defined in Military Specification MIL-STD-889. Preferred galvanically close materials are defined as materials that range between steel 1010 and titanium as listed in Table II of MIL-STD-889.

A high velocity oxy-fuel (HVOF) spraying process can be used to apply the conductive corrosion resistant coating, as corrosion resistant coatings produced by this process can have high adhesion strengths up to and exceeding 10,000 P.S.I. and are very dense, which protects the steel substrate from water and moisture. Examples of materials that can be applied using a high velocity oxy-fuel (HVOF) spraying process include alloys, ceramics, cermets listed on pages HVOF-1 thru HVOF-25 Sulzer-Metco Thermal Spray Materials Guide issued February 2006. The lower limit of 200 PSI is needed for the coating, however most coatings have higher tensile strength ranges. In some embodiments, the conductive corrosion resistant coating may include chromium carbide and nickel chromium alloys. The amount of nickel chromium and chromium carbide can be varied to optimize conductivity.

The corrosion resistant coating may be thermally sprayed, copper, titanium, stainless steel, molybdenum, Inconel® 625, Inconel® 618, Inconel® 718, Ni-Chrome®, age hardened nickel-based superalloys such as Rene® 80, nickel, nickel aluminide, Monel®, K-Monel®, AISI 316L, AISI 316, AISI 301, AISI 302, AISI 304, bronze, MP135N (a cobalt, chromium molybdenum based alloy), or other multi-phase alloys, cobalt, or cobalt alloys among other alloys. Other 300 series alloys include austenitic stainless steel, Carpenter alloys, Nickel-Copper Alloy 400, MP35N Alloy, Carpenter C-276 Alloy (UNS N10276), Custom Age 625 Plus® Alloy, L-605 Alloy, Type 409Cb Stainless, Type 430FR Solenoid Quality Stainless, Type 430F Stainless, Type 430 Stainless, Pyrowear® 675 Stainless, Pyromet® Alloy 718, Pyromet® Alloy 625, 20Mo-60 HS Stainless (UNS N08036), 20Mo-6® Stainless (UNS N08026), 15-15LC® Modified Stainless, Carpenter 22Cr-13Ni-5Mn Stainless (UNS S20910), Duplex Alloy 255 Carpenter Alloy 925 (UNS N09925), 25Ni-20Cr-6Mo Stainless (UNS N08925 N08926), Micro-Melt® CCW Alloy, BioBlu 27 Alloy, Micro-Melt® CCW Plus Alloy, Duplex Alloy 2205, Pyromet® Alloy 617, Nickel Alloy 211, Nickel Alloy 205, Ni-4Al Alloy, Nickel Alloy 206, and titanium alloys.

Thermally applied and brazed alloys can be used to produce a conductive corrosion resistant coating that is metallurgically bonded to the steel. Examples of suitable brazing alloys include Wall Colmonoy Corporation NICROBRAZ® Technical data sheet No. 2.1.1.

In another example, an explosive clad corrosion resistant alloy can be applied to the steel surface, prior to adhesive bonding. Explosively bonded dissimilar metals can act as an inhibitor to galvanic activity that would occur between mechanically fastened dissimilar metals. Maritime applications benefit from the use of explosively bonded metals by allowing for weldable transitions between dissimilar metals that also reduce or eliminate galvanic corrosion. Examples of suitable explosively clad materials include stainless steel, Inconel®, titanium and other more nobel than steel alloys that are capable of explosive bonding on to steel to produce a clad coating.

A cermet coating or a ceramic coating that is corrosion resistant can be used if a conductive path is either not required or can be established by other means. A cermet is a composite material including ceramic and metallic materials, and is designed to have the optimal properties of both a ceramic, such as high temperature resistance and hardness, and those of a metal, such as the ability to undergo plastic deformation. The metal is used as a binder for an oxide, boride, or carbide. Generally, the metallic elements used are nickel, molybdenum, and cobalt. Depending on the physical structure of the material, cermets can also be metal matrix composites.

Typical coatings such as zinc, aluminum, and combinations of zinc and aluminum alloys such as galvanize are normally used to protect the steel from pitting and general corrosion. These normally used anodic coatings will protect the steel from corrosion, however are not as useful for bonding applications. This is because moisture and or water can surprisingly migrate through a sealed organic coating, sealant or adhesive and start the corrosion mechanism on the surface of a bonded non-corrosion resistant steel structure. In testing of an adhesive bonding primer, it has been shown that moisture could penetrate the primer which is used as protection. Corrosion can begin on the steel surface under the coating even before the coating is attacked or appears to be degraded by moisture on the steel surface. The steel corrosion products can expand the bonded joint, which can result in failures of the bonded joint structure as corrosion progresses.

In one aspect, this invention addresses this problem by using protective coating materials that are more noble than steel. In the embodiments described above, a corrosion resistant coating is used to protect the bondline from degradation by corrosion. The described assemblies are suitable for use in corrosive environments, for example, where they might be exposed to sea water.

In other embodiments, the components to be bonded may include ferrous materials or other materials, such as aluminum, that are subject to corrosion. These embodiments would be similar to the embodiments of FIGS. 1-4 with the steel replaced by such other materials.

Whereas particular embodiments of this invention have been described above for purposes of illustration, it will be evident to those skilled in the art that numerous variations of the details of the present invention may be made without departing from the invention as defined in the appended claims.

The invention claimed is:

1. An apparatus comprising:
a first steel component having a first surface;
a second steel component having a second surface;
an electrically conductive, corrosion resistant coating directly on at least one of the first and second surfaces; and
an electrically conductive adhesive directly between the electrically conductive, corrosion resistant coating and one of the first and second surfaces, the electrically conductive adhesive bonding the first and second components together.

2. The apparatus of claim 1, wherein the corrosion resistant coating comprises:
a thermally sprayed coating.

3. The apparatus of claim 1, wherein the corrosion resistant coating is more noble than the steel.

4. The apparatus of claim 1, further comprising:
a primer between the adhesive and at least one of the first and second components.

5. The apparatus of claim 1, further comprising:
a sealant adjacent to edges of the adhesive.

6. The apparatus of claim 1, wherein the corrosion resistance coating comprises:
a chromium carbide or nickel chromium alloy.

7. The apparatus of claim 1, wherein the corrosion resistance coating comprises at least one of:
thermally sprayed, copper, titanium, stainless steel, molybdenum, bronze, cobalt and cobalt alloys.

8. The apparatus of claim 1, wherein the corrosion resistance coating comprises:
thermally applied or brazed alloys having a metallurgical bond to the steel.

9. The apparatus of claim 1, wherein the corrosion resistance coating comprises:
an explosive clad corrosion resistant alloy.

10. An apparatus comprising:
a first steel component having a first surface;
a second steel component having a second surface;
an electrically insulating corrosion resistant coating directly on at least one of the first and second surfaces;
an adhesive layer directly between the electrically insulating corrosion resistant layer and one of the first and second surfaces bonding the first and second components together; and
an electrically conducting element that electrically connects the first and second steel components.

11. The apparatus of claim 10, further comprising:
a primer between the adhesive and at least one of the first and second components.

12. The apparatus of claim 10, further comprising:
a sealant adjacent to edges of the adhesive.

13. The apparatus of claim 10, wherein the electrically insulating corrosion resistant coating comprises a cermet or a ceramic.

14. The apparatus of claim 10, wherein the electrically conducting element comprises at least one of:
a bolt, fastener or gasket.

15. The apparatus of claim 1, further comprising:
a second corrosion resistant coating on the first corrosion resistant coating.

16. The apparatus of claim 15, wherein the second corrosion resistance coating consists of:
graphite.

17. The apparatus of claim 15, wherein the first corrosion resistance coating comprises:
titanium or a titanium based alloy.

18. The apparatus of claim 1, wherein the adhesive layer comprises one of: polyurethane, silicone, epoxy, acrylic, polysulfides, epoxy cured polythioether, thermoset materials, and thermoplastic materials.

19. The apparatus of claim 10, wherein the adhesive layer comprises one of: polyurethane, silicone, epoxy, acrylic, polysulfides, epoxy cured polythioether, thermoset materials, and thermoplastic materials.

20. The apparatus of claim 10, wherein the adhesive comprises:
a material that meets the requirements of Military Specification MIL-P-24441/1B.

* * * * *